July 4, 1961  C. H. JOHNSON  2,990,740
LOCATING APPARATUS FOR MACHINE TOOLS
Filed Feb. 27, 1957  7 Sheets-Sheet 3

INVENTOR.
CHARLES H. JOHNSON
BY
Andrus & Sceales
Attorneys

July 4, 1961 C. H. JOHNSON 2,990,740
LOCATING APPARATUS FOR MACHINE TOOLS
Filed Feb. 27, 1957 7 Sheets-Sheet 4

INVENTOR.
CHARLES H. JOHNSON
BY
Attorneys

July 4, 1961  C. H. JOHNSON  2,990,740
LOCATING APPARATUS FOR MACHINE TOOLS
Filed Feb. 27, 1957  7 Sheets-Sheet 5

INVENTOR.
CHARLES H. JOHNSON
BY
Attorneys

July 4, 1961 C. H. JOHNSON 2,990,740
LOCATING APPARATUS FOR MACHINE TOOLS
Filed Feb. 27, 1957 7 Sheets-Sheet 7

INVENTOR.
CHARLES H. JOHNSON
BY
Andrus & Sceales
Attorneys

United States Patent Office 2,990,740
Patented July 4, 1961

2,990,740
LOCATING APPARATUS FOR MACHINE TOOLS
Charles H. Johnson, Madison, Wis., assignor to Gisholt Machine Company, Madison, Wis., a corporation of Wisconsin
Filed Feb. 27, 1957, Ser. No. 642,829
4 Claims. (Cl. 82—14)

This invention relates to a locating apparatus for machine tools, and more particularly to an apparatus for accurately determining the coordinate relationship between a tool, a tracer template and a rotary workpiece to be machined on a lathe or the like.

In the machining of metal workpieces of varying contour, a tracer apparatus may be provided to control the cutting movements of the tool so that a finished piece of accurately controlled dimensions results from the operation.

This is particularly true in a machine such as that described in my copending application Serial No. 642,753 filed on even date herewith and entitled "Center Drive Machine Tool."

My copending application discloses a machine tool adapted to machine workpieces such as jet engine compressor discs. These discs usually have faces which must be substantially identical in contour, and wall portions of extremely thin section. To provide simultaneous machining of both exposed workpiece faces, a carriage is mounted on each side of the centrally mounted spindle, and a template controlled servo-actuated tool unit is mounted on each carriage. Means are provided to produce simultaneous cutting passes on each face of the workpiece, with the tools in spaced point-to-point relationship to support the workpiece.

To properly co-ordinate each tool position relative to its respective template and to co-ordinate each tool position relative to the other tool, means must be provided to locate the tools in relation to the templates and to each other.

In addition, the templates must be properly located with respect to the spindle axis.

The present invention is based on novel locating apparatus which provides the necessary relationships, and utilizes a fixed point of reference on the machine from which the relationships may be determined visually.

The accompanying drawings illustrate the best mode presently contemplated by the inventor for carrying out the invention.

As shown in the drawings, the machine tool comprises, generally, a rigidly supported bed 1, a headstock unit 2 disposed centrally of the bed and supported thereby, a left and a right carriage, 3 and 4 respectively, disposed for longitudinal movement on the corresponding left and right halves of the bed, and a longitudinally extending stabilizer support 5 disposed above bed 1 and securing the upper portion of headstock unit 2. Support 5 comprises an overhead beam or bridge 6 supported by suitable vertical columns 7 at each end of the bed.

Headstock unit 2 comprises a rotatable spindle 8 mounted in a suitable housing and to which a chuck member 9 is secured, and with the latter adapted to hold a workpiece 10 concentrically in position for machining operations. The workpieces are often provided with an axial opening therein, although this is not necessary for the proper functioning of the apparatus. Spindle 8 is driven to rotate workpiece 10 by a suitable motor connected through suitable gearing and shafts to the spindle, such as that disclosed in my above-identified copending application.

Left carriage 3 and right carriage 4 are supported by bed 1 on the corresponding side of headstock unit 2, and are adapted for longitudinal or feed movement on suitable ways 11 and 12. Cross slides 13 and 14 are mounted on the corresponding left and right carriages and are adapted for transverse movement on suitable ways 15 and 16. Since both carriages 3 and 4 and their associated elements are substantially identical except for a reversal of parts, reference will be made only to one carriage, it being understood that the description applies equally well to both carriages. In the description, the term inwardly will indicate toward headstock unit 2 and the term outwardly will indicate away from the headstock unit.

Figures 3, 4, 12, 18:
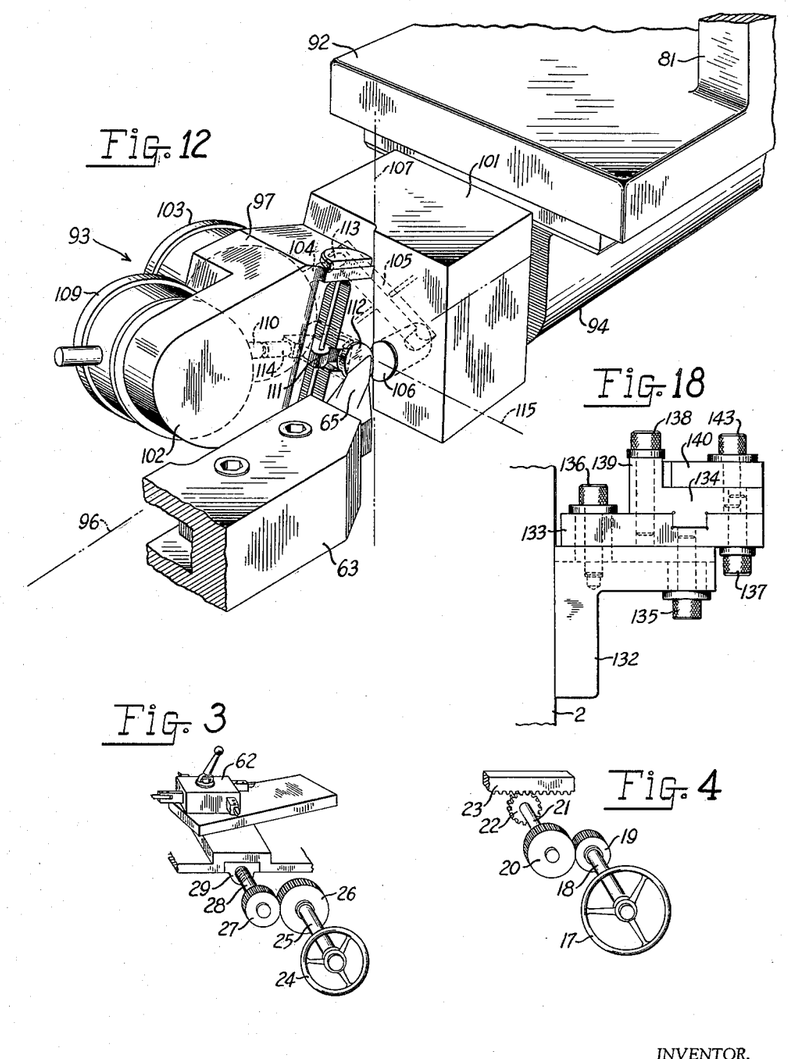
FIG. 3 is a schematic perspective view of the cross feed apparatus.
FIG. 4 is a schematic perspective view of the carriage feed.
FIG. 12 is an enlarged perspective rear view of the gauge dial apparatus.
FIG. 18 is a side elevation of the tool setting gauge assembly of FIG. 16.

As shown schematically in FIG. 4, each carriage may be manually moved longitudinally on its respective ways by a handwheel 17 mounted on the carriage apron and keyed to a rearwardly extending rotatable shaft 18, the latter being connected through a pinion 19 and gear 20 to a rearwardly extending shaft 21. A pinion 22 is keyed to the rear end portion of shaft 21 and meshes with a longitudinally extending rack 23 on bed 1. Rotation of handwheel 17 will thus move the carriage longitudinally on the respective way.

Manual control of cross slide movement is provided by a second handwheel 24 mounted inwardly of handwheel 17 on the carriage apron. Handwheel 24 is keyed to a rearwardly extending rotatable shaft 25, the latter being connected through a gear 26 and pinion 27 to a rearwardly extending rotatable cross slide feed screw 28. A cross slide nut 29 is threadably mounted on feed screw 28 within a transverse groove in the carriage and is bolted or otherwise secured to the respective cross slides. Rotation of feed screw 28 by means of handwheel 24 will cause nut 29 and the cross slide to move transversely on the carriage.

The structure herein described for actuation of the carriages and cross slides is similar to that described in my copending application Serial No. 642,753, with some gear trains, clutches and other intermediate and related structure removed for purposes of greater clarity.

Both carriages and cross slides are also adapted for selective and/or simultaneous connection to at least one common drive motor, as described in my above copending application.

Machining of each side of a workpiece 10 is accomplished by mechanism including a pair of multi-face transversely extending indexing drums 30, somewhat similar to those disclosed in my copending United States application, Serial No. 534,419, filed September 15, 1955, now abandoned in favor of continuation application Serial No. 785,549, now Patent No. 2,924,127. Each drum 30 is disposed adjacent the outer end portion of the respective carriage and is journaled in suitable bearings disposed in upstanding front and rear housings, 31 and 32 respectively mounted on the carriage. Drum 30 may be indexed by any suitable means, such as those disclosed in either of my above copending applications.

Figures 5, 6, 8:
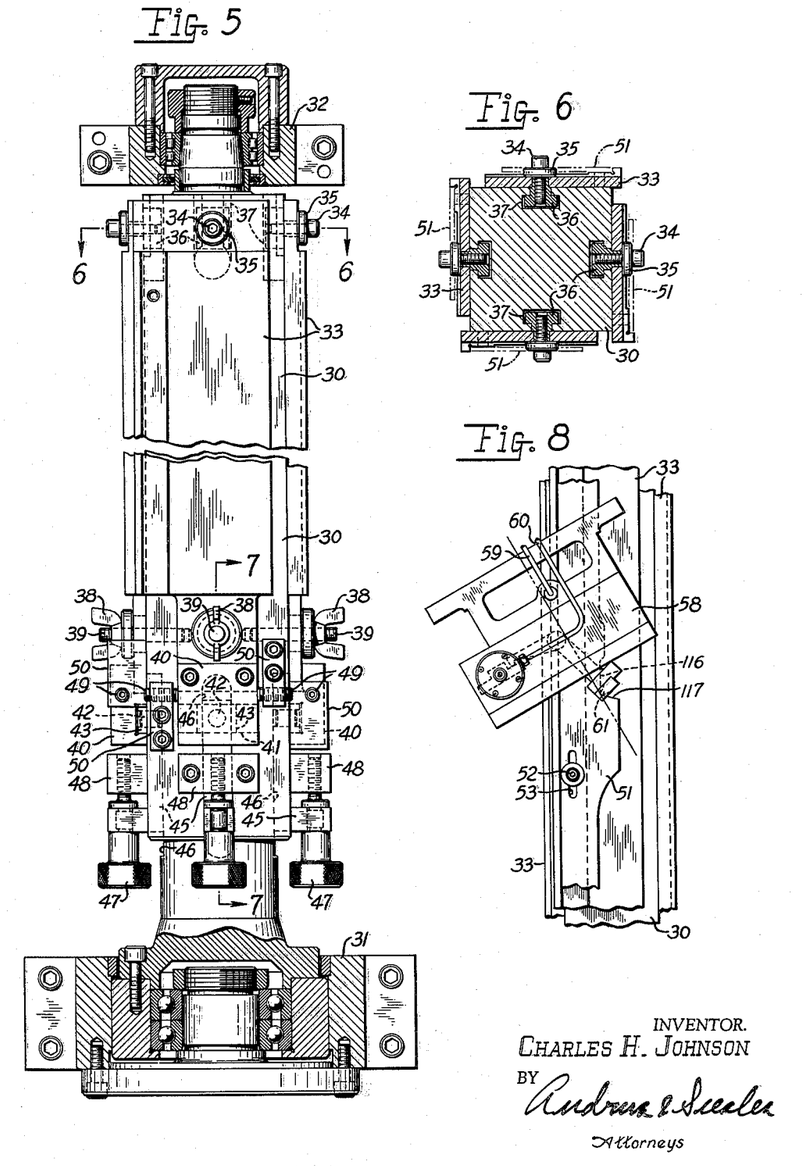
FIG. 5 is an enlarged top plan view of the indexing drum and with parts broken away.
FIG. 6 is a cross section of the indexing drum showing the rear pivot arrangement, taken on line 6—6 of FIG. 5.
FIG. 8 is an enlarged fragmentary top plan view of the tracing apparatus and index drum.
Figure 7:
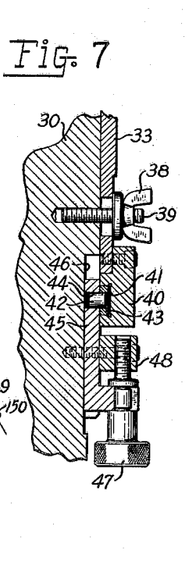
FIG. 7 is a cross section of the indexing drum showing the front offset adjustment, taken on line 7—7 of FIG. 5.

As shown in FIGS. 5, 6 and 7, each face of a drum 30 is provided with a template mounting plate 33 which is secured to the surface thereof and is substantially coextensive therewith. Plate 33 is adapted for slidable and pivotal adjustment relative to its drum face, and the rear end portion thereof is provided with a suitable downwardly extending screw 34 and washer 35. The lower end of screw 34 is threadably received in a T nut 36 which is slidably disposed in an axially extending slotted groove 37 in the drum face and which extends forwardly from the rear end thereof.

Plate 33 may be pivotally adjusted about screw 34 and T nut 36, and groove 37 permits axial adjustment thereof. The upper end portion of T nut 36 is of such a length as to permit turning and sliding of plate 33 when screw 34 is tightened.

The forward end portion of each plate 33 is secured to the drum face by a wing nut 38 threadably mounted on a stud 39 which extends through plate 33 and into drum 30 (FIG. 7). A clamping block 40 is bolted to the forward end of plate 33. The lower face of block 40 is provided with a transversely extending groove 41, and a downwardly extending pin 42 is secured in a block 43 adapted for sliding movement in groove 41. The lower end of pin 42 is disposed in an opening 44 in the rearward end portion of an axially extending bracket 45 which is mounted for axial sliding movement in a groove 46 in the drum face (FIG. 5).

Actuation of bracket 45 and its connected elements is provided by an adjustment screw 47 which is secured to an upstanding flange on the forward end of bracket 45. The rearwardly extending portion of screw 47 is threadably received in a screw block 48 which is fixedly mounted on the drum face.

When wing nut 38 is loosened, turning of adjustment screw 47 will provide a transverse adjustment of mounting plate 33. Pivotal adjustment of plate 33 about the rear end thereof is possible by manually moving the front portion of plate 33 laterally so that pin 42 and block 43 slide in groove 41. The opening in plate 33 through which stud 39 passes must be oversize to allow shifting of plate 33 relative thereto. When the desired pivotal adjustment has been accomplished, a pair of oppositely disposed set screws 49 are tightened to opposite sides of clamping block 40, and wing nut 38 is tightened. Set screws 49 are mounted in suitable brackets 50 which are fixedly secured to the drum face.

Figure 2:
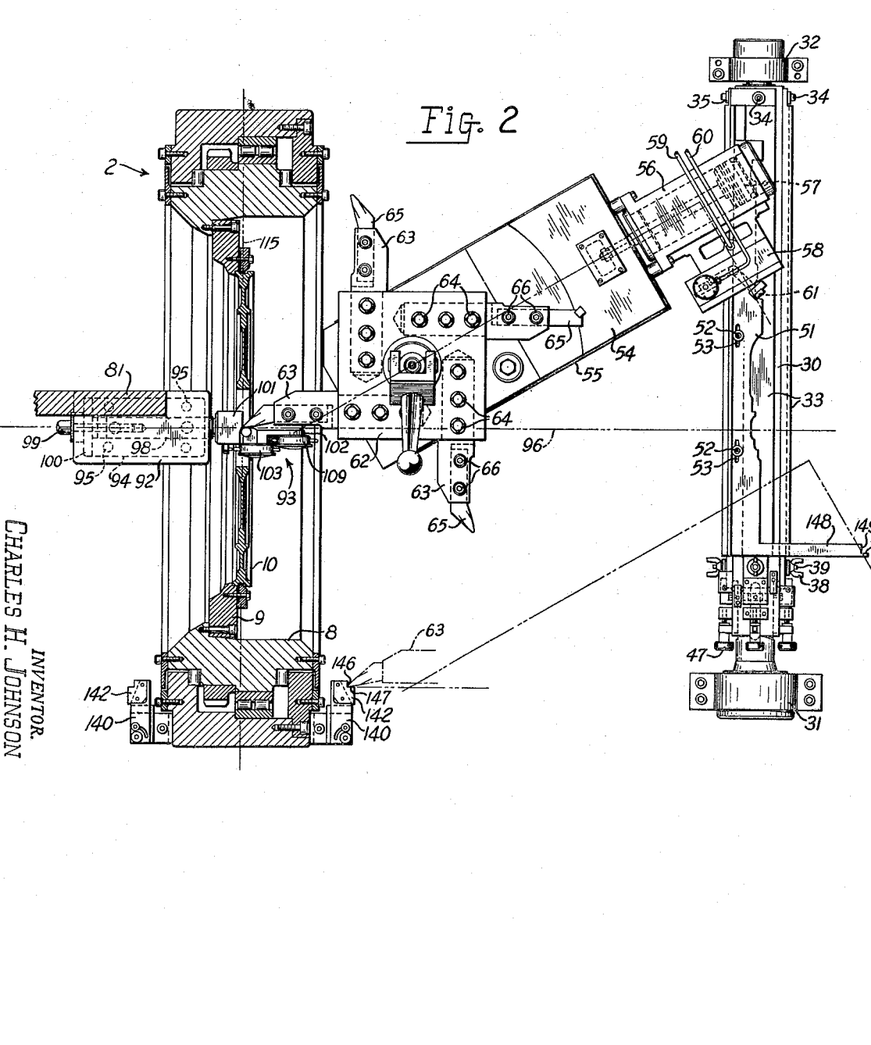
FIG. 2 is a top plan view of the right hand portion of the machine tool with parts broken away.

A tracer pattern tool guide template or cam 51 is fixedly mounted on each plate 33 by bolts 52 which extend through slots 53 in the cam and into the plate (FIG. 2). The configuration of the slots 53 shown is such as to permit adjustment of a cam 51 on the plate 33 transversely of the machine. Adjustment of plate 33 in a manner described above will provide a corresponding adjustment of cam 51.

Any given indexed position of drum 30 is such that one of the cams 51 will be disposed horizontally on an upwardly disposed drum face.

The cam surface of the upwardly disposed cam 51 provides a tool guide path and is adapted to control follower or tracer apparatus which comprises a tracer slide member 54 mounted for sliding movement on suitable ways 55. Ways 55 are mounted for horizontal pivotal adjustment on the cross slide. Ways 55 are shown in FIG. 2 as being at a substantial angle to the spindle axis. A hydraulic cylinder 56 is secured to the outer end of tracer slide 54, and a piston and rod member 57 is disposed therein and extends therefrom, and is secured to ways 55.

The cylinder actuating means may be of a type similar to those disclosed in my above copending applications. For this purpose, a housing 58 is provided adjacent cylinder 56. Suitable fluid control means, not shown, are provided in housing 58 and are connected by fluid lines 59 and 60 to ports in the opposite ends of cylinder 56. A downwardly extending follower or tracer finger 61 is mounted adjacent housing 58 and is connected to the fluid control mechanism therein. Finger 61 is adapted to be biased against the cam surface of the upper cam 51 and to follow the varying contour thereof during a feed movement of the cross slide. As the following action occurs, finger 61 will cause fluid to be selectively introduced and withdrawn from the corresponding ends of cylinder 56 to move tracer slide 54 on ways 55 in response to the cam surface contour.

An indexable turret member 62 is suitably mounted on the inner end portion of each tracer slide 54. Each turret member shown has four faces, with each face having a large opening to receive the inner end portion of a tool holder 63. Holder 63 is adjustably secured within the opening by bolts 64 which extend through the upper portion of turret 62 and tighten on said inner end portion.

Each holder 63 on each turret 62 is adapted to secure the shank end of a tool 65 therein and has bolts 66 extending therethrough for securing the tool 65 in any desired adjusted position. Shims, not shown, may be provided between the tool and holder to provide vertical adjustment of the tool point. In the absence of shims, it will be assumed that both tool points lie in a horizontal plane running through the spindle axis. Each indexed position of each turret 62 provides a positioning of one corresponding tool in readiness for machining.

In machining a workpiece such as that shown in FIG. 2, index drums 30 are positioned with cams 51 in position for following. Tracer slides 54 are set at the desired angle from the spindle axis. The desired left and right tools 65 are brought up to workpiece 10, and the cross slides fed laterally so that both sides of the workpiece are machined at the same time.

When workpieces are to be machined to very thin sections such as .115 inch, it is important that the tool points of left and right tools 65 simultaneously engage opposite corresponding points on the opposite workpiece faces, and continue to do so as they are fed across the faces. Each tool thus provides a support for the opposite tool and the workpiece. In addition, it is important that the exact depth of cut for each face be accurately controlled. This requires proper dimensional coordination between each tool and its respective controlling tracer cam, as well as between respective facing tools.

Figure 1:
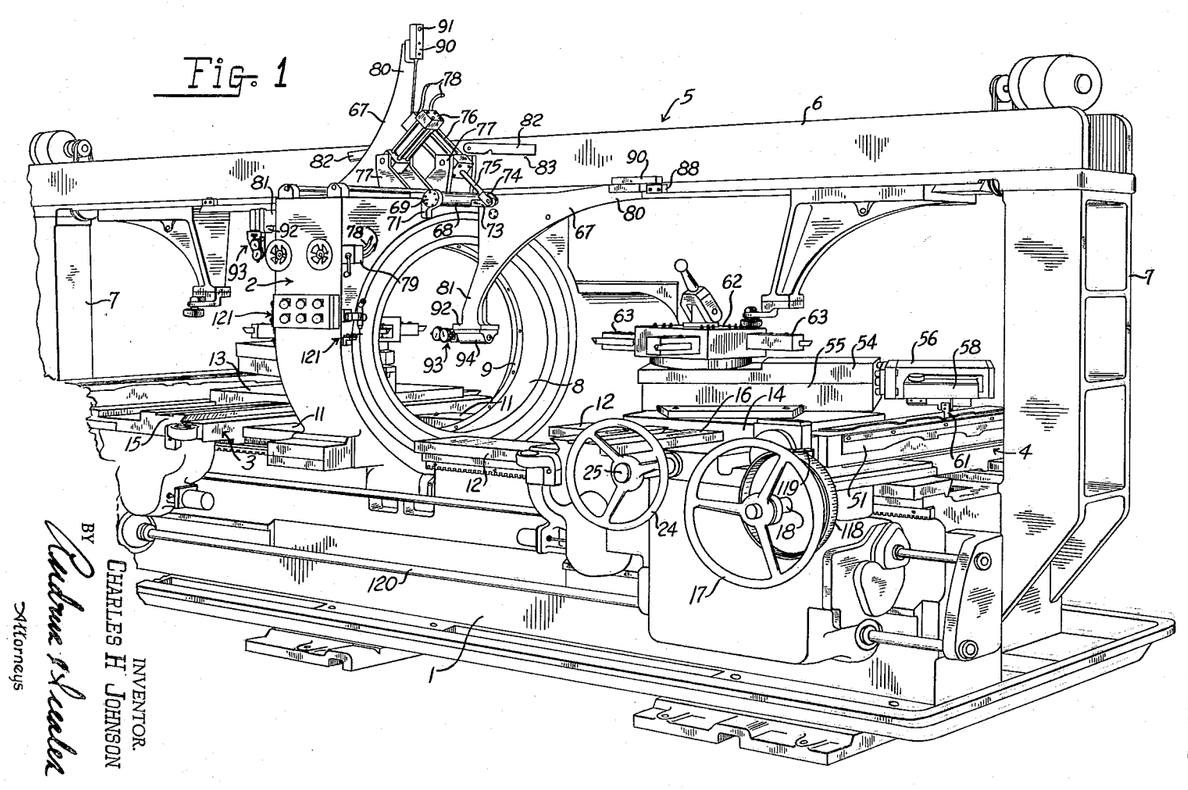
FIGURE 1 is a perspective view of a machine tool having locating apparatus in accordance with the invention.
Figure 9:
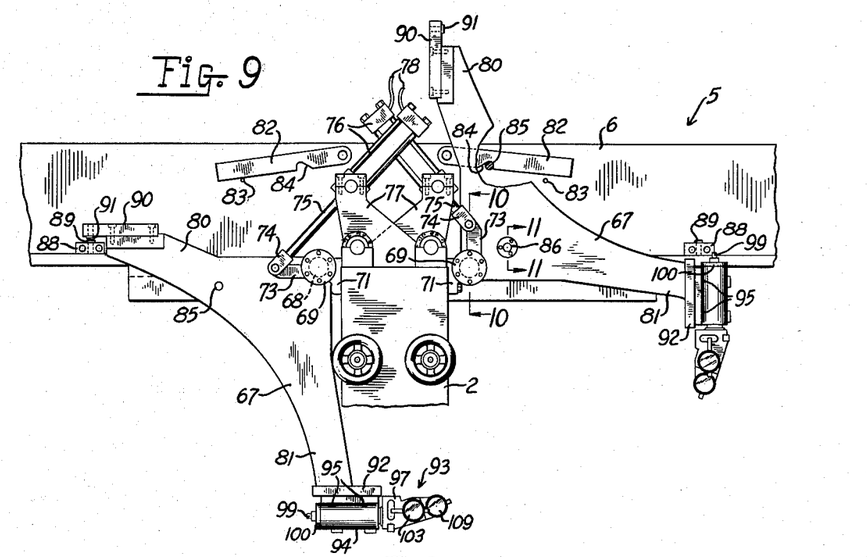
FIG. 9 is an enlarged fragmentary front elevation of the central portion of the overhead bridge and showing gauging arms and dials.
Figure 10:
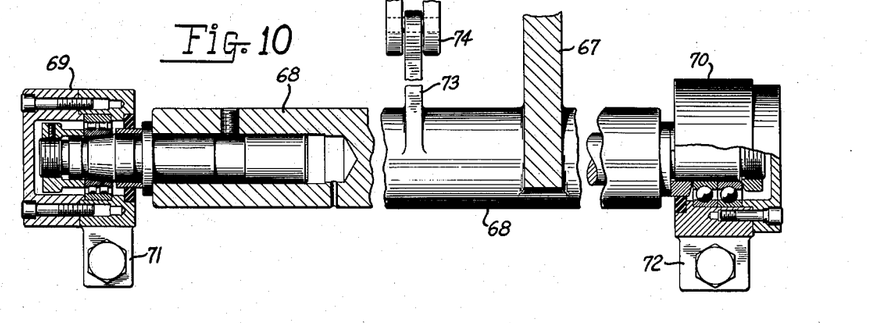
FIG. 10 is an enlarged fragmentary sectional view of the bearing and support means for the gauge arms, taken on line 10—10 of FIG. 9.
Figure 11:
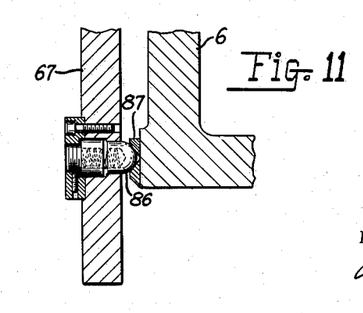
FIG. 11 is an enlarged fragmentary sectional view of the detent holding means, taken on line 11—11 of FIG. 9.
Figure 13:
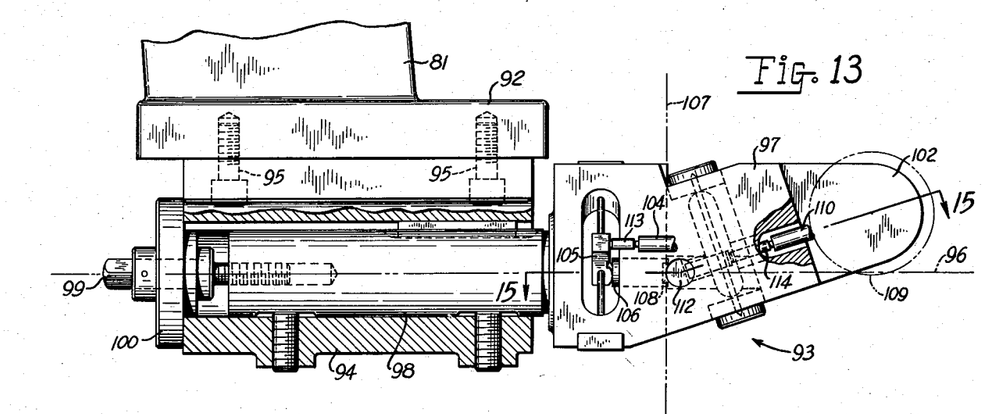
FIG. 13 is an enlarged front elevation of the gauge dial apparatus with parts broken away and the gauge dials shown in phantom line.
Figure 14:
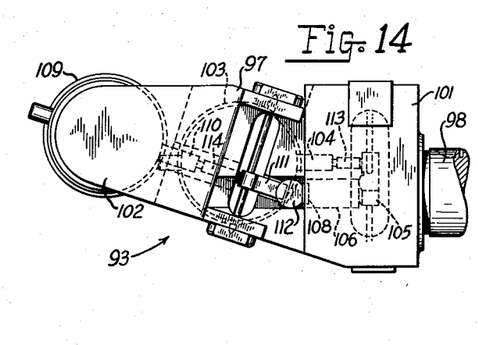
FIG. 14 is an enlarged rear elevation of the gauge dial apparatus.
Figure 15:
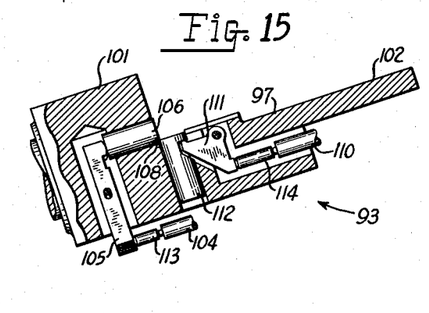
FIG. 15 is a sectional view of the gauge dial apparatus taken on line 15—15 of FIG. 13.

For this purpose, mechanism is provided which includes a pair of generally Y-shaped left and right arms 67, mounted for pivotal movement adjacent headstock unit 2 (FIGS. 1 and 9). The base portion of each arm is welded or otherwise secured to a transversely extending shaft 68 which is mounted for pivotal movement in front and rear bearings, 69 and 70 respectively, secured adjacent the upper edge of the corresponding lateral face of the headstock spindle housing by brackets 71 and 72.

A crank arm 73 extends outwardly from each shaft 68 forwardly of arm 67, and the outer end thereof is pivotally secured to a yoke member 74 fixedly connected to the outer end of a piston and rod member 75. The inner end of member 75 is disposed within an upwardly extending hydraulic cylinder 76, the lower end portion of which is pivotally mounted on a bracket 77 secured to the headstock housing unit 2. Cylinder 76 extends upwardly at an angle of approximately 45° and is supplied with hydraulic or pneumatic fluid for actuation of the piston 75 via lines 78 which are connected to a suitable control valve 79 mounted on headstock unit 2. Valve 79 may be supplied with fluid from any suitable source, not shown.

Selective manual adjustment of valve 79 will actuate member 75 and cause the latter to be moved upwardly in cylinder 76, thereby pivoting arm 67 to its uppermost position, shown in FIG. 9, through crank arm 73 and shaft 68. In this position, one leg 80 of arm 67 extends upwardly in a substantially vertical direction, and the other leg 81 extends outwardly substantially horizontally.

The upper limit of pivotal movement of each arm 67 is at least partially controlled by a latch member 82 which is pivoted adjacent its inner end to the front face of bridge 6 and behind arm 67 when the latter is in its upper position. Latch 82 extends outwardly parallel to the bridge face, and the outer end thereof normally rests on a pin 83 secured to bridge 6. A notch 84 is disposed in the lower edge of latch 82 and is adapted to be engaged by a pin 85 which is secured to arm 67 and extends rearwardly therefrom. As arm 67 is raised, pin 85 will contact the side of notch 84 nearest the latch pivot and will tend to raise latch 82 from pin 83. As arm 67 pivots upwardly a slight additional distance, a spring-pressed pin 86 mounted on the rearward wall of arm 67 engages a detent 87 secured to the forward wall of bridge 6.

When the hydraulic pressure in cylinder 76 is released, notch 84 and detent 87 will hold arm 67 in place. To release arm 67, latch 82 is raised manually or by any other suitable means, not shown, and piston 75 is actuated by selective manual adjustment of valve 79 to lower the arm. The hydraulic pressure will be sufficient to release pin 86 from detent 87.

The lower limit of pivotal movement of each arm 67 is provided by a stop block 88 mounted on the forward face of bridge 6. A vertical stop button 89 is disposed within block 88 and extends upwardly therefrom. A block 90 is mounted on the end portion of leg 80 and has a similar stop button 91 disposed therein. As arm 67 is lowered, button 89 is engaged by button 91 to prevent further downward movement of the arm. The stop buttons are preferably ground or otherwise adjusted so that when arm 67 is in its lowered position, leg 81 will extend downwardly so that a mounting plate or flange 92 or the lower end thereof will be disposed exactly horizontally.

A tool gauging unit 93 is secured to each flange 92 and, as shown in FIGS. 12–15, comprises a longitudinally extending housing 94 disposed beneath flange 92 and secured thereto by a plurality of bolts 95.

It is important that the gauging units be disposed parallel to the longitudinal spindle axis 96 and also parallel to bed 1, and thus it is desirable that the lower face of flange 92 be disposed parallel to the bed. For this purpose, the lower surface of flange 92 may be ground so that it is parallel to bed 1 when the arm 67 is lowered. Housing 94 may then be secured to flange 92 so that the former extends parallel to spindle axis 96, and the ground surface of flange 92 will provide parallelism of the housing with bed 1. Vertical adjustment of housing 94 relative to flange 92 may be accomplished by the use of suitable shims, not shown, disposed therebetween.

A gauge mounting member 97 is disposed inwardly of housing 94 and has an extension 98 which extends within a chamber in the housing. Horizontal adjustment of member 97 is provided by a threaded shaft 99 which is rotatably mounted in a cover plate 100 at the far end of the chamber and which is threadably received in the end of extension 98.

Gauge mounting member 97 is generally L-shaped and with the shorter leg 101 thereof disposed laterally and secured to the outer end of extension 98, and with the longer leg 102 thereof extending longitudinally from the forward portion thereof.

A gauge 103 is disposed centrally on the front face of leg 102 and has a horizontal actuator rod 104 (FIG. 15) extending therefrom which terminates adjacent the front face of leg 101. The end of rod 104 engages the outer end portion of a substantially straight lever arm 105 which extends rearwardly through an opening in leg 101 and is horizontally pivoted adjacent its center within the opening. The inner end portion of lever arm 105 engages the inner end of a coordinate register member, such as a cylindrical gauging button 106 disposed at a right angle thereto and slidable in a longitudinally extending hole in leg 101. The outer end coordinate surface of button 106 terminates adjacent the outer lateral vertical face of leg 101 and overlaps the vertical corner axis 107 between the legs so that a portion of button 106 is concealed behind leg 102. In order to accommodate some movement of button 106 outwardly of the opening, the end thereof is cut away, as at 108, behind leg 102. Engagement of the outer end of button 106 by the point of a tool 65 will actuate rod 104 through lever arm 105 to change the reading on the gauge dial.

A second gauge 109 is mounted in a depressed portion of the end of the front face of leg 102 and has a longitudinally extending actuator rod 110 extending therefrom through an opening in leg 102. The inner end of rod 110 engages one end portion of a right angle lever 111 which is horizontally pivoted within the opening. The other end of lever 111 engages a slotted portion adjacent the forward end of a coordinate register member, such as a cylindrical gauging button 112 disposed at a right angle to rod 110 and slidable in a laterally extending hole in leg 102.

The axis of button 106 extends parallel to spindle axis 96, and is perpendicular to the axis of button 112. The outer end coordinate surface of button 112 overlaps the cut-away portion 108 of button 106 so that the button ends are mutually overlapping at right angles. Cut-away 108 is such as to permit slight outward movement of the end of button 112 beyond the rear face of leg 102. Engagement of the outer end of button 112 by the front face of a tool 65 will actuate rod 110 through lever 111 to change the reading on the gauge dial.

Normally, both buttons will extend slightly outwardly from their respective leg faces, this positioning being provided by spring mechanism, not shown, in each gauge which tends to bias rods 104 and 110 outwardly slightly.

Each gauge 103 and 109 is preferably provided with a visually observable dial which is responsive to the position of rods 104 and 110 and gives a visual reading thereof. The dial reading may be manually adjusted for any given position of buttons 106 and 112, by means of adjustment screws 113 and 114 which are threadably secured to the ends of rods 104 and 110 respectively.

The dials may be calibrated in any desired manner, but for purposes of this invention it is preferable that they be calibrated in distance units, such as inches and/or fractions thereof.

Assuming that there is at least one tool 65 secured to each turret 62, and assuming that it is desired to machine both faces of a workpiece 10 simultaneously, with each tool providing backing for the workpiece and the opposing tool, the locating apparatus may now be utilized to coordinate each tool position relative to its respective template and relative to the opposing tool.

To coordinate the right tool properly, left arm 67 is lowered hydraulically until left stop button 89 is engaged by left stop button 91, thereby preventing further downward movement of the arm. At the lowered position of left arm 67, left gauge mounting member 97 should be disposed so that left gauges 103 and 109 lie to the right of the transverse spindle center line 115 (FIG. 2), and so that axis 107 passes through the intersection of line 115 and the longitudinal spindle axis 96 and so that the overlapping portions of the ends of buttons 106 and 112 are disposed adjacent thereto. The axis of button 112 will be parallel to line 115. The exact position of center line 115 and axis 96 may be determined by any measuring means, and both provide fixed reference positions on the machine tool.

It will be assumed that the workpiece 10 has a large central opening therein and will be mounted prior to co-ordination of the tools and template so that its axis will coincide with the spindle axis 96 and so that a vertical plane containing center line 115 bisects the workpiece vertically into two substantially identical halves.

A gauge check block, or other suitable apparatus, not shown, may be utilized to position the end surface of button 106 so that it contains line 115 and to position the end surface of button 112 so that it lies on the spindle axis 96. Screws 113 and 114 are then turned to set the respective gauge dials to the desired reading. Since the end surface of button 106 indicates the longitudinal position relative to center line 115, and since the end surface of button 112 indicates the transverse position relative to axis 96, it would be preferable that the gauge dials be set to read 0, 0 which indicates a gauge station fixed at the center point of spindle 8, i.e. the intersection of center line 115 and axis 96.

A tracer cam 51 is then secured to the upper indexed surface of right mounting plate 33, with cam 51 having a following surface defining the configuration desired for the right face of workpiece 10. Although it would be possible to machine some workpieces when finger 61 and the point of a tool 65 lie in the same longitudinal plane, it is preferable that the tracer slide 54 be disposed at such an angle from the longitudinal that finger 61 is offset a known amount from a longitudinal center line parallel to spindle axis 96. Cam 51 should then be offset a corresponding amount from such a center line, as shown in FIG. 2. Right tracer slide 54 is then positioned relative to the spindle axis, and so that the point of a tool 65 lies adjacent axis 96.

The center portion of the following surface of tracer template 51 contains a coordinate register indicium portion providing a guide station having a predetermined positional relationship relative to the cam surface guide path. This portion is independent from the usable portion of the cam edge and comprises a bench mark defined by a transversely extending surface 116 and a substantially longitudinally extending surface 117 which intersects surface 116, as shown in FIG. 8. Surface 117 may be at a slight angle to the longitudinal to compensate for tool point curvature. The intersection of surfaces 116 and 117 is positioned relative to the remainder of the cam surface so as to correspond to the actual center point of a mounted workpiece 10.

The angular position of cam 51 relative to the workpiece should be determined. If surface 116 is not parallel to spindle center line 115, the mounting plate 33 may be pivoted about screw 34 as described above until such parallel relationship is established.

Right handwheel 17 is then turned to move right carriage 4 inwardly until right tool 65 is disposed behind member 97. Right tracer slide 54 is adjusted to bring finger 61 into normal working engagement with tracer pattern 51 and so that finger 61 engages transverse surface 116. The tool point should then engage the end surface of button 106 so that it is pushed back and gauge 103 reads 0, indicating that the tool point is on the spindle center line 115. If gauge 103 does not read 0, carriage 4 is moved longitudinally until such reading is produced. Alternatively, tool 65 may be moved longitudinally in its tool holder 63, or tool holder 63 may be adjusted longitudinally in turret 62.

After the desired reading of gauge 103 has been obtained, right handwheel 24 is turned to move right cross slide 14 transversely until finger 61 engages surface 117 of cam 51. The forward edge of the tool point should then engage the end surface of button 112 so that the latter is pushed back and gauge 109 reads 0, indicating that the tool point lies on the spindle axis 96. If gauge 109 does not read 0, screw 8 is loosened and adjustment screw 47 is turned, as described hereinbefore, so that plate 33 and tracer pattern 51 are shifted transversely until the 0 reading is obtained. This indicates a determinable fixed relationship between the guide station defined by surfaces 116 and 117 and the tool point positioned at the gauge station. Screw 38 is then tightened so that pattern 51 is secured in its proper position.

When finger 61 engages both surfaces 116 and 117, and thereby produces a reading of 0, 0 on the gauges, the tool point will lie on the center point and center line 115 of spindle 8 and the position of tracer pattern 51 will be coordinated therewith. Additional patterns 51 may be coordinated with additional corresponding tools on right turret 62 in the same manner.

The structure described provides means for several different coordinations:

(a) Angular coordination between the tracer template and the workpiece or spindle, (b) Longitudinal coordination between the template surface, tool point, workpiece center point and spindle center line, and (c) Transverse or cross coordination between the template surface, tool point, workpiece center point and spindle center line.

To coordinate the position of a left tool with a right tool, left arm 67 is hydraulically raised to its uppermost position and locked in place, as heretofore described. Right carriage 4 must then be retracted so that right arm 67 may be lowered. To prevent loss of the proper carriage position for machining purposes, i.e., the position in which the right tool point produces a reading of 0 on gauge 103, a large dial 118 is disposed behind handwheel 17 and keyed to shaft 18. The circumferential surface of dial 118 is provided with numerical gradations or other suitable indicia which are indicated by a fixed pointer 119. Thus, the reading of dial 118 may be taken when the tool point produces a 0 reading of gauge 103, so that right carriage 4 may be returned to the same position when machining is to begin.

Right arm 67 is then lowered hydraulically, and the positions of the left tools and tracer patterns are coordinated with the center point and center line 115 of spindle 8 in a manner similar to that described above.

Since both left and right tools 65 and left and right tracer patterns 51 will have been coordinated with a single point of reference, the left and right tools and patterns will be coordinated with each other.

Right arm 67 is then raised to its upper position and cross slides 13 and 14 are moved so that fingers 61 engage identical starting portions of their respective patterns 51. The spindle motor is then actuated to rotate spindle 8, and both carriages 3 and 4 are moved inwardly until the original readings of dials 118 are obtained. Cross slides 13 and 14 are then connected to a common drive shaft 120 which is driven from the motor, and slides 13 and 14 are thus moved in synchronism with the spindle rotation to feed the opposite working tools 65 across their respective workpiece faces. The mechanism connecting the motor and cross slides is disclosed in detail in my first-mentioned co-pending application Serial No. 642,753. Since both tools 65 and tracer patterns 51 were coordinated with a fixed point of reference, and since both cross slides 13 and 14 are driven in synchronism, opposing tools 65 will remain in facing relationship throughout the feed cycle.

Although in the illustration, the tool points and their respective tracer fingers will not lie in the same longitudinal plane, nevertheless after gauging, each tracer pattern surface will bear a given fixed positional relationship relative to its respective working tool point path.

In some instances, it may also be desirable to mount workpiece 10 so that it is not bisected by a vertical plane containing center line 115. The workpiece could be mounted entirely outside of such a plane. In this case the apparatus would have to be adjusted accordingly, and workpiece 10 would still be maintained in a predetermined position relative to center line 115.

For example, if a workpiece 10 is to be mounted so that its center point is shifted a certain known distance from the spindle center line 115 and toward the right end of the machine, the cam surface of left template 51 would have to be shifted a corresponding distance rightwardly from its bench mark intersection of surfaces 116 and 117. Left template 51 would in this instance be narrower than the template illustrated in the drawings. In addition, the cam surface of right template 51 would have to be shifted a corresponding distance rightwardly toward the respective bench mark intersection, and right template 51 would then be wider than that illustrated in the drawings. This change would be accomplished in the manufacture of the templates.

The bench marks on both templates 51 would remain in the same position relative to the machine as before, and the gauging units would not be changed and would read 0, 0 when the respective tool points are disposed at the intersection of axis 96 and center line 115.

Here again, each opposed working tool point path will bear a given fixed relationship to its controlling tracer pattern and to the opposing tool point path, and each opposite tracer pattern will bear a given fixed relationship to the opposing pattern, all relationships being relative to fixed known portions on the machine. Coordination of tool placement and movement may thus again be accomplished in the desired manner.

If it is desired to machine only one face of a workpiece, the apparatus of the invention permits coordination of the desired working tool with its respective tracer pattern so that the various configurations to be machined on the workpiece will occur at the proper distance from the workpiece axis and center point.

Figures 16, 17:
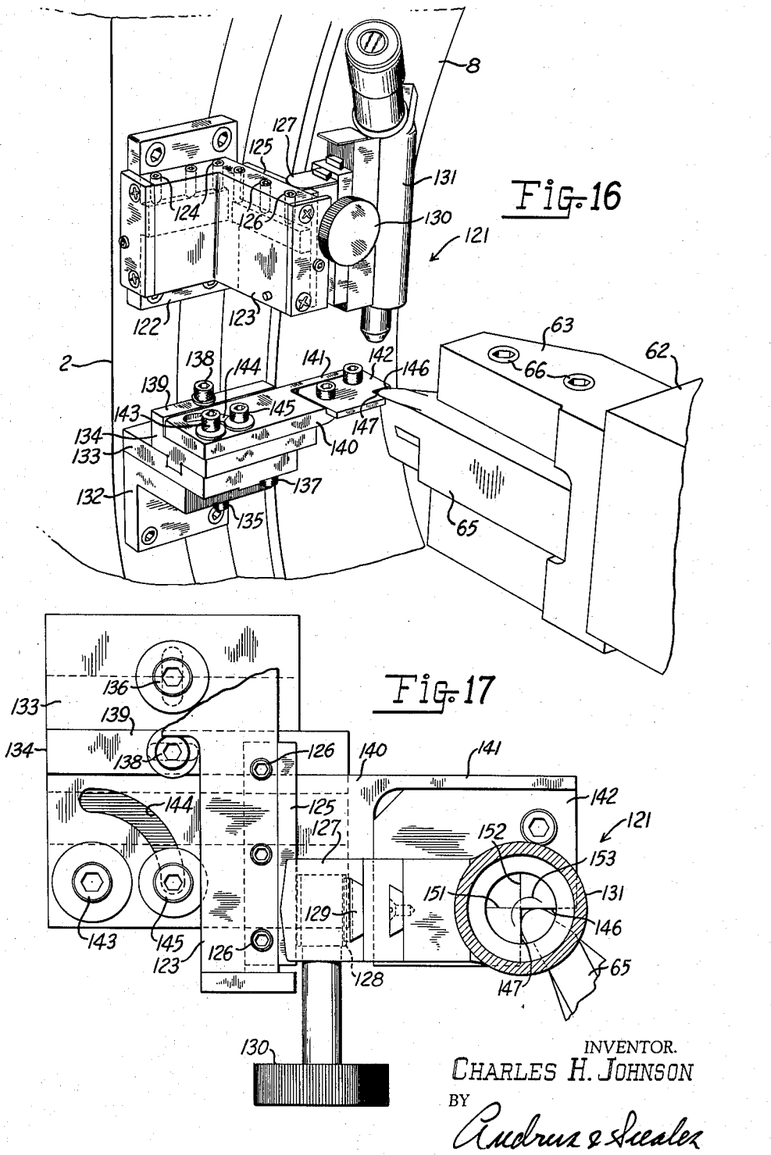
FIG. 16 is a perspective view of a second embodiment of the invention showing the microscope and tool gauge.
FIG. 17 is an enlarged top plan view of the apparatus of FIG. 16 with the microscope barrel in section.

FIGS. 16–18 show a second embodiment of the invention whereby optical means are utilized to produce the proper coordination. In this embodiment, a microscope observation gauge unit 121 is mounted on each transverse face of the headstock unit and forwardly of spindle 8. Unit 121 comprises a microscope assembly mounted vertically above a tool setting gauge assembly and adapted for optical observation of the latter and the tool point.

Each miscroscope assembly comprises a dovetail bracket 122 secured to headstock unit 2. An angle bracket 123 is mounted for transverse sliding movement on the dovetail portion of bracket 122 and is adapted to be tightened thereto by screws 124. Bracket 123 has an outwardly extending portion and with the inner longitudinal face thereof having a longitudinal groove adapted to receive the dovetail portion of a dovetail plate 125. Plate 125 is adapted for longitudinal sliding movement relative to bracket 123 and is tightened thereto by screws 126 which pass vertically through the latter and engage the plate. A vertically extending microscope mount 127 is secured to plate 125 and receives a pinion 128 adapted to mesh with a dovetail rack member 129 vertically movable in a groove in mount 127. Controlled movement of rack 129 is provided by a knob 130 secured to the outer end of pinion 128. A microscope 131 is secured to rack 129 and permits observation of objects directly beneath.

The above-described structure permits adjustment of microscope 131 in transverse, longitudinal and vertical directions relative to the machine.

Each tool setting gauge assembly comprises an angle gauge bracket 132 secured to headstock unit 2 beneath the corresponding microscope assembly. An intermediate dovetail slide plate 133 is mounted for longitudinal sliding movement on the upper horizontal surface of bracket 132, with the dovetail portion of the former fitting in a suitable groove of the latter. The upper surface of slide plate 133 is provided with a transverse groove adapted to slideably receive the downwardly extending guide portion of a top slide plate 134.

A screw 135 passes upwardly through a longitudinally slotted opening in the horizontal portion of bracket 132 and is received in a threaded opening in intermediate slide plate 133. Similarly, a screw 136 passes downwardly through a longitudinally slotted opening in plate 133 adjacent housing unit 2 and is received in a threaded opening in bracket 132. When screws 135 and 136 are loosened, intermediate slide plate 133 may be moved longitudinally relative to bracket 132, limited only by the length of the respective slots. Tightening of screws 135 and 136 will secure plate 133 to the bracket.

A screw 137 similarly passes upwardly through a transverse slot in plate 133 and is received in a threaded opening in top slide plate 134. Likewise, a screw 138 passes downwardly through a transverse slot in a flange 139 of plate 134 and is received in a threaded opening in intermediate slide plate 133. When screws 137 and 138 are loosened, top slide plate 134 may be moved transversely relative to intermediate slide plate 133, limited only by the length of the respective slots. Tightening of screws 137 and 138 will secure plate 134 to plate 133.

A gauge holder 140 is mounted on the upper surface of top slide 134 and has a rearwardly extending flange 141 on which a coordinate registry member, such as a tool gauge member 142 is secured. Longitudinal and transverse adjustment of gauge member 142 is provided by the various slide plates described above. Pivotal adjustment of member 142 is accomplished by pivoting gauge holder 140 about a pivot screw 143 which is disposed adjacent the outer forward corner of the gauge assembly and passes through holder 140 into a threaded opening in top slide plate 134. An arcuate guide slot 144 is disposed in member 140 which extends from a point rearwardly of screw 143 to a point inwardly thereof. The center of curvature of slot 144 lies on the vertical axis of screw 143. A suitable guide screw 145 extends downwardly through slot 144 and is threadably received in an opening in slide plate 134. Screws 143 and 145 may be loosened or tightened as desired to permit pivoting or fixed securement of holder 140.

Each tool gauge 142 is provided with a coordinate registry bench mark portion on its outer rearward corner, the bench mark providing a gauge station defined by a transversely extending coordinate surface 146 and a substantially longitudinally extending coordinate surface 147.

To provide the necessary coordination, gauge 142 should be selectively positioned so that the intersection of surface 146 and 147 bears a given known fixed positional relationship with the center point and center line 115 of spindle 8. This intersection will be placed at a coordinate point indicated by a certain distance along axis 96 from the spindle center point, and a certain distance forwardly therefrom. The exact coordination point at which the intersection is placed will be at least partially determined by the angle at which tracer slide 54 is disposed. It will be assumed that tool gauge 142 lies in a horizontal plane passing through spindle axis 96. The longitudinal positioning of gauge 142 is accomplished by adjusting slide plate 133 on bracket 132 and the transverse positioning of gauge 142 is accomplished by adjusting slide plate 134 on slide plate 133.

To utilize unit 121, the end portion of each tracer cam 51 is provided with an outwardly extending leg 148 which has a coordinate registry indicium bench mark thereon having a transverse surface 149 and a longitudinal surface 150, corresponding to surfaces 146 and 147. The surfaces 149 and 150 provide a guide station which must bear the same or a similar relative positional relationship to the remainder of the cam surface path of cam 51 as surfaces 146 and 147 bear to the desired corresponding tool cutting path or finished face of workpiece 10. Where the cam has both an end bench mark as well as a center bench mark of the type described hereinbefore, the intersection of surfaces 149 and 150 would have the same positional relationship relative to the intersection of surfaces 116 and 117 as the intersection of surfaces 146 and 147 would have relative to the center point of spindle 8 or the desired point on spindle axis 96. If tracer slide 54 is disposed at an angle to axis 96, the corresponding cams 51 would have to be shifted accordingly, just as when the gauge dials are utilized.

For coordinating the right tools and cams, right handwheel 17 is turned to move right carriage 4 inwardly until a right tool 65 is disposed adjacent tool gauge 142. Right tracer slide 54 is adjusted to bring finger 61 into normal working engagement with tracer pattern 51 and so that finger 61 engages surface 149. The tool point should then engage right surface 146. If the tool point does not engage surface 146, carriage 4 is moved longitudinally until such reading is produced, or the alternatives described hereinbefore may be utilized.

Subsequently, right handwheel 24 is turned to move right cross slide 14 transversely until finger 61 engages surface 150. The forward edge of the tool point should then engage right surface 147, and if this does not occur, the tracer pattern is suitably shifted to provide the proper positional relationships, as described hereinbefore.

When finger 61 engages surfaces 149 and 150 and the tool point engages surfaces 146 and 147, the tool point will have the same positional relationship relative to the corresponding cutting tool path or finished workpiece face as the intersection of surfaces 149 and 150 have with the cam working surface. Thus there will be longitudinal and cross coordination between the right template, tool point workpiece center point and spindle center line.

To provide a high degree of accuracy of tool point placement relative to right surfaces 146 and 147, and to provide a means whereby shifts in the position of tool gauge 142 may be visually detected, the right microscope 131 is adjusted above the right tool gauge 142 so that, upon viewing, the microscope cross hairs 151 and 152 coincide exactly with adjusted surfaces 146 and 147 respectively.

In some instances it is desirable to set the position of gauge 142 semi-permanently. Since vibrations during machining operations may change the adjustment slightly over a period of time, the surfaces 146 and 147 may shift, which will be indicated by a lack of coincidence with the cross hairs when viewed through the microscope. Gauge 142 and possibly microscope 131 would then have to be readjusted to the original positions. If desired, gauge 142 may be utilized for an initial rough tool adjustment, and microscope 131 used for the final or fine adjustment.

The microscope provides a highly magnified view of the tool point, and is utilized not only to provide a high degree of accuracy of tool point placement relative to surfaces 146 and 147, but also may be used to observe wearing of the tool point so that the latter may be replaced at the proper time. In the latter instance, a tool point outline curve 153 may be disposed in the microscope in addition to the cross hairs, curve 153 indicating the desired configuration or contour of a perfect tool point. Upon viewing through the microscope, a tool point may be compared with curve 153, and if the comparison shows tool point wear, the tool may be replaced.

If desired, once microscope 131 is properly adjusted, tool gauge 142 may be removed and the desired coordination provided by moving the tool point up so that it coincides with the intersection of cross hairs 151 and 152.

Coordination between the left template, tool point and workpiece center point is accomplished in a similar manner, utilizing the mechanism on the left side of unit 2, and including a left microscope observation gauge unit 121. Again, the left and right tools and tracer patterns will be coordinated with each other. Subsequent operation of the machine will be similar to that described above in regard to the gauge dials.

The apparatus of the invention provides a novel means including visually observable structure for relatively positioning dual tracer apparatus and tool points so that oppositely disposed tools may simultaneously machine corresponding portions of opposite workpiece faces during the machining cycle, and in response to the tracer apparatus. Each tool is moved in response to the command signal produced by traversing of the respective tracer pattern contour by the stylus so that the path of tool cutting movement bears a similar relationship to the gauge station as the path of the tracer pattern bears to the template bench marks. In addition, the path of cutting movement of one tool will have a known controlled relationship with the path of cutting movement of the opposite tool.

Various modes of carrying out the invention are contemplated as being within the scope of the following claims particularly pointing out and distinctly claiming the subject matter which is regarded as the invention.

I claim:

1. Tool locating means for use with an apparatus defining a first axis and a second axis extending transverse to said first axis and which intersects the latter at a fixed tool-locating reference point, said tool locating means comprising, a frame, an arm mounted on said frame for pivoting in a plane containing said first axis, a gauge device mounted on said arm and with said device providing a pair of intersecting surfaces adapted to define a third axis during locating, means for pivoting said arm in said plane to bring said gauge device toward said reference point so that said third axis approaches said point and intersects said point during locating, and mutually engageable stop means disposed on said arm and on said frame with said stop means being positioned to positively locate and stop pivoting movement of said arm when said third axis is disposed for locating a tool adjacent said reference point.

2. The tool locating means of claim 1 in which the arm pivoting means is constructed to raise said arm so that said gauge device is moved away from the said reference point; latch means mounted on said frame and disposed to be engaged by said arm to lock said arm in raised position, and means disposed between said frame and said arm for holding the arm in raised position when said latch is released.

3. The tool locating means of claim 2 in which said arm is pivoted on a shaft mounted for rotation in bearings on said frame; and the arm pivoting means comprises, a crank secured to said shaft, a cylinder pivotally mounted at one end to said frame, a piston slideable in said cylinder and connected to said crank at the other end of said cylinder, and means for moving said piston within the cylinder.

4. The tool locating means of claim 1 which includes: a fixed template having an edge with a contour surface portion, means connecting said edge and the tool for driving the tool along a desired path in response to following movement of the connecting means along said contour surface portion, and a bench mark on the said edge and spaced from the said contour surface portion so that the distance from the said mark to any part of said contour surface portion is equivalent to the distance from the said reference point to a similar portion of the said path.

References Cited in the file of this patent

UNITED STATES PATENTS

| | | |
|---|---|---|
| 727,413 | McCracken | May 5, 1903 |
| 758,628 | Earle | May 3, 1904 |
| 961,281 | Andrew | June 14, 1910 |
| 1,404,545 | Richardson | Jan. 24, 1922 |
| 1,907,469 | Thomson | May 9, 1933 |
| 2,028,134 | Brubaker | Jan. 21, 1936 |
| 2,130,710 | Alexander | Sept. 20, 1938 |
| 2,197,308 | Kolb | Apr. 16, 1940 |
| 2,249,121 | Drescher | July 15, 1941 |
| 2,289,244 | Cook | July 7, 1942 |
| 2,417,234 | Calow | Mar. 11, 1947 |
| 2,587,542 | Siekmann | Feb. 26, 1952 |
| 2,603,117 | Turchan | July 15, 1952 |
| 2,632,353 | Montanus | Mar. 24, 1953 |
| 2,697,373 | Siekmann | Dec. 21, 1954 |
| 2,777,201 | Wetzel | Jan. 15, 1957 |
| 2,782,520 | Amend | Feb. 26, 1957 |

FOREIGN PATENTS

| | | |
|---|---|---|
| 216,537 | Great Britain | Jan. 29, 1925 |